United States Patent
Ohkuma (10) Patent No.: US 7,327,644 B2
(45) Date of Patent: Feb. 5, 2008

(54) OPTICAL PICKUP AND DISC DRIVE APPARATUS

(75) Inventor: Hideo Ohkuma, Tokyo (JP)

(73) Assignee: Sony Corporation (JP)

( * ) Notice: Subject to any disclaimer, the term of this patent is extended or adjusted under 35 U.S.C. 154(b) by 540 days.

(21) Appl. No.: 10/911,548

(22) Filed: Aug. 5, 2004

(65) Prior Publication Data
US 2005/0052965 A1    Mar. 10, 2005

(30) Foreign Application Priority Data
Aug. 19, 2003   (JP)   ............ P2003-295058

(51) Int. Cl.
*G11B 7/00*   (2006.01)
(52) U.S. Cl. ............ 369/44.32; 720/681; 369/44.22; 369/44.15
(58) Field of Classification Search ............ None
See application file for complete search history.

(56) References Cited
U.S. PATENT DOCUMENTS
2004/0145976 A1*   7/2004   Tanaka et al. .......... 369/44.32

FOREIGN PATENT DOCUMENTS
JP   10-261233   9/1998
JP   2001-110075   4/2001

* cited by examiner

*Primary Examiner*—Wayne Young
*Assistant Examiner*—Adam R. Giesy
(74) *Attorney, Agent, or Firm*—Rader Fishman & Grauer PLLC; Ronald P. Kananen (57) ABSTRACT

In order to simplify operation control and achieve smaller-sized apparatuses, the present invention provides an object lens drive apparatus having a fixed block, a movable block holding an objective lens, support springs connecting the fixed block and the movable block, a focusing coil, tracking coils, a tilt coil, first magnets constituting a first magnetic circuit, and a second magnet constituting a second magnetic circuit and arranged in a state being inserted in the tilt coil. The objective lens and the second magnet are positioned separately in a direction orthogonal to both a focusing and tracking directions. The second magnet is polarized to an N pole and an S pole parallely in the tracking direction. Portions of the tilt coil opposed to each other in the tracking direction with the second magnet put therebetween are formed to be tilt drive portions moving the movable block in a tilt direction.

4 Claims, 5 Drawing Sheets

OPTICAL PICKUP AND DISC DRIVE APPARATUS

CROSS REFERENCES TO RELATED APPLICATIONS

The present document is based on Japanese Priority Document JP 2003-295058, filed in the Japanese Patent Office on Aug. 19, 2003, the entire contents of which being incorporated herein by reference.

BACKGROUND OF THE INVENTION

1. Field of the Invention

The present invention relates to an optical pickup and a disc drive apparatus. More minutely, the present invention relates to a technical field of an optical pickup including an objective lens driving apparatus in which a movable block is supported by a fixed block with a support spring put between them and the movable block is moved in three directions of a focusing direction, a tracking direction and a tilt direction, and a disc drive apparatus provided with the optical pickup.

2. Description of Related Art

There is a disc drive apparatus for performing the recording and the reproducing of an information signal into and from a disc-shaped recording medium such as an optical disc and a magneto-optical disc. Such a disc drive apparatus is provided with an optical pickup, which moves in a radial direction of the disc-shaped recording medium to radiate a laser beam to the disc-shaped recording medium.

The optical pickup is provided with an objective lens driving apparatus. A focusing adjustment is carried out by the objective lens driving apparatus moving an objective lens held by the movable block thereof in a focusing direction, which is the direction in which the movable block approaches to or withdraws from the recording surface of the disc-shaped recording medium. Also a tracking adjustment is carried out by the objective lens driving apparatus by moving the objective lens in a tracking direction, which is substantially a radial direction of the disc-shaped recording medium, and thereby the optical pickup condenses the spot of a laser beam to be radiated onto the disc-shaped recording medium through the objective lens to a recording track of the disc-shaped recording medium.

As described above, the optical pickup generally performs the focusing adjustment and the tracking adjustment by means of the objective lens driving apparatus. However, in recent years, for achieving improvement of the traceability of a spot of a laser beam to a recording track, an objective lens driving apparatus called a "three-axis actuator" has been developed. The three-axis actuator also enables the adjustment at the time of the occurrence of surface vibrations and the like of a rotating disc-shaped recording medium by enabling the movable block to tilt to the recording surface of the disc-shaped recording medium in addition to the two-axis direction adjustment of the focusing adjustment and the tracking adjustment.

Such objective lens driving apparatuses called the three-axis actuators, for example, include one which moves a movable block in three directions of a focusing direction, a tracking direction and a tilt direction by means of a plurality of coil bodies each made by unifying a focusing coil, a tracking coil and a tilt coil (see, for example, Patent Document 1).

Moreover, the objective lens driving apparatus called the three-axis actuators, for example, also include one which moves a movable block into a focusing direction and a tracking direction by means of a coil body made by unifying a focusing coil and a tracking coil, and which moves the movable block in a tilt direction by means of a plurality of tilt coils provided separately from the focusing coil and the tracking coil (see, for example, Patent Document 2).

[Patent Document 1] Japanese Patent Application Publication No. Hei 10-261233

[Patent Document 2] Japanese Patent Application Publication No. 2001-110075

SUMMARY OF THE INVENTION

However, because three kinds of coils of the focusing coils, the tracking coils and the tilt coils, each having a different function from each other, are unified in the above-mentioned conventional objective lens driving apparatus of the optical pickup shown in Patent Document 1, the operation control of the objective lens driving apparatus is complicated. Also because the focusing coils are severally divided into a plurality of portions, there is a possibility that the decrease of sensitivity at a focusing operation occurs.

On the other hand, because the tilt coils are separately arranged from the focusing coil and the tracking coil in the conventional objective lens driving apparatus of the optical pickup shown in Patent Document 2, the simplification of operation control can be achieved. However, the plurality of tilt coils and a plurality of tilt magnets positioned to be opposed to the tilt coils are needed, and then the objective lens driving apparatus has problems of an increase of the number of parts and of growth in size.

Accordingly, an optical pickup and a disc drive apparatus according to the present invention each have an object to overcome the above-mentioned problems to achieve the simplification of operation control, miniaturization and the like.

For solving the above-mentioned problems, an objective lens driving apparatus and a disc drive apparatus according to the present invention are severally provided with, as components of the objective lens driving apparatus, a fixed block, a movable block, a support spring, a focusing coil, a tracking coil, a tilt coil, a first magnet, and a second magnet. The fixed block is fixed to a moving base. The movable block moves in a focusing direction being one in which the movable block approaches to or withdraws from a recording surface of the disc-shaped recording medium against the fixed block, a tracking direction being substantially a radial direction of the disc-shaped recording medium, and a tilt direction being a rotation direction around an axis perpendicular to both of the focusing direction and the tracking direction, and holds the objective lens. The support spring connects the fixed block and the movable block with each other. The focusing coil is energized at the time when the movable block operates into the focusing direction, the tracking coil is energized at the time when the movable block operates into the tracking direction, and the tilt coil is energized at the time when the movable block operates into the tilt direction. The first magnet constitutes a first magnetic circuit together with the focusing coil and the tracking coil, and the second magnet constitutes a second magnetic circuit together with the tilt coil and is arranged in a state in which the second magnet is inserted into the tilt coil. In the objective lens driving apparatus, the objective lens and the second magnet are positioned separately in a direction perpendicular to both of the focusing direction and the tracking direction, the second magnet has an N pole and an S pole, both polarized in juxtaposition in the tracking direction, and portions of the tilt coil opposed to each other in the tracking direction with the second magnet put therebetween are severally formed to be a tilt drive portion for moving the movable block in the tilt direction.

Consequently, in the objective lens driving apparatus and the disc drive apparatus according to the present invention, the tilt coil is arranged independently from the focusing coil and the tracking coil, and the second magnet for a tilt drive is arranged inside of the tilt coil.

An optical pickup according to the present invention is one provided with a moving base moving in a radial direction of a disc-shaped recording medium mounted on a disc table, and an objective lens driving apparatus arranged in the moving base. The objective lens driving apparatus includes: a fixed block, a movable block, a support spring, a focusing coil, a tracking coil, a tilt coil, a first magnet, and a second magnet. The fixed block is fixed to a moving base. The movable block moves in a focusing direction being one in which the movable block approaches to or withdraws from a recording surface of the disc-shaped recording medium against the fixed block, a tracking direction being substantially a radial direction of the disc-shaped recording medium, and a tilt direction being a rotation direction around an axis perpendicular to both of the focusing direction and the tracking direction, and holds the objective lens. The support spring connects the fixed block and the movable block with each other. The focusing coil is energized at the time when the movable block operates into the focusing direction, the tracking coil is energized at the time when the movable block operates into the tracking direction, and the tilt coil is energized at the time when the movable block operates into the tilt direction. The first magnet constitutes a first magnetic circuit together with the focusing coil and the tracking coil, and the second magnet constitutes a second magnetic circuit together with the tilt coil and is arranged in a state in which the second magnet is inserted into the tilt coil. In the objective lens driving apparatus, the objective lens and the second magnet are positioned separately in a direction perpendicular to both of the focusing direction and the tracking direction, the second magnet has an N pole and an S pole, both polarized in juxtaposition in the tracking direction, and portions of the tilt coil opposed to each other in the tracking direction with the second magnet put therebetween are severally formed to be a tilt drive portion for moving the movable block in the tilt direction.

Consequently, because the first magnetic circuit for performing a focusing drive and a tracking drive and the second magnetic circuit for performing a tilt drive are formed separately from each other, the simplification of operation control can be achieved, and furthermore the improvement of sensitivity at a focusing operation can be achieved.

Moreover, because the second magnet having the n pole and the s pole, both polarized in juxtaposition in the tracking direction, is arranged in a state in which the second magnet is inserted into the tilt coil, the space inside of the tilt coil can be effectively used as an arrangement space of the second magnet, and consequently miniaturization can be achieved by the degree of the space.

In another aspect of the present invention, the focusing coil is arranged between the objective lens and the second magnet, and the movable block is configured to tilt into the tilt direction owing to a traverse of a leakage flux of the second magnet across the focusing coil when the focusing coil is energized, and further positions of the N pole and the S pole of the second magnet are set in order that a tilt of the movable block owing to the leakage flux of the second magnet when the focusing coil is energized may be in a same direction as a tilt direction of a recording surface owing to a warpage of the disc-shaped recording medium. Consequently, the drive quantity of the movable block by the second magnetic circuit at the time of the tilt drive can be decreased, and thereby it can be achieved to make operation control easier and to decrease electric power consumption.

Moreover, because the direction in which the tilt drive is performed by the second magnetic circuit is the same as the direction in which the movable block is tilted owing to the influence of the leakage flux of the second magnet, the force generated by the second magnetic circuit and the force generated by the influence of the leakage flux of the second magnet are not to be any resistance to each other, and thereby the improvement of the reliability of the operation of the focusing drive and the tilt drive can be achieved.

A disc drive apparatus according to the present invention is a disc drive apparatus equipped with a disc table, on which a disc-shaped recording medium is mounted, and an optical pickup radiating a laser beam to the disc-shaped recording medium mounted on the disc table through an objective lens. The optical pickup includes a moving base moving into a radial direction of the disc-shaped recording medium mounted on the disc table, and an objective lens driving apparatus arranged on the moving base. The objective lens driving apparatus includes: a fixed block, a movable block, a support spring, a focusing coil, a tracking coil, a tilt coil, a first magnet, and a second magnet. The fixed block is fixed to a moving base. The movable block moves in a focusing direction being one in which the movable block approaches to or withdraws from a recording surface of the disc-shaped recording medium against the fixed block, a tracking direction being substantially a radial direction of the disc-shaped recording medium, and a tilt direction being a rotation direction around an axis perpendicular to both of the focusing direction and the tracking direction, and holds the objective lens. The support spring connects the fixed block and the movable block with each other. The focusing coil is energized at the time when the movable block operates into the focusing direction, the tracking coil is energized at the time when the movable block operates into the tracking direction, and the tilt coil is energized at the time when the movable block operates into the tilt direction. The first magnet constitutes a first magnetic circuit together with the focusing coil and the tracking coil, and the second magnet constitutes a second magnetic circuit together with the tilt coil and is arranged in a state in which the second magnet is inserted into the tilt coil. In the objective lens driving apparatus, the objective lens and the second magnet are positioned separately in a direction perpendicular to both of the focusing direction and the tracking direction, the second magnet has an N-pole and an S-pole, both polarized in juxtaposition in the tracking direction, and portions of the tilt coil opposed to each other in the tracking direction with the second magnet put therebetween are severally formed to be a tilt drive portion for moving the movable block in the tilt direction.

Consequently, because the first magnetic circuit for performing a focusing drive and a tracking drive and the second magnetic circuit for performing a tilt drive are formed separately from each other, the simplification of operation control can be achieved, and furthermore the improvement of sensitivity at a focusing operation can be achieved.

Moreover, because the second magnet having the n pole and the s pole, both polarized in juxtaposition in the tracking direction, is arranged in a state in which the second magnet is inserted into the tilt coil, the space inside of the tilt coil can be effectively used as an arrangement space of the second magnet, and consequently miniaturization can be achieved by the degree of the space.

In still another aspect of the present invention, the focusing coil is arranged between the objective lens and the second magnet, and the movable block is configured to tilt in the tilt direction owing to a traverse of the focusing coil by a leakage flux of the second magnet when the focusing coil is energized, and further positions of the N pole and the S pole of the second magnet are set in order that a tilt of the movable block owing to the leakage flux of the second magnet when the focusing coil is energized may be in a same direction as a tilt direction of the recording surface owing to a warpage of the disc-shaped recording medium. Consequently, the drive quantity of the movable block by the second magnetic circuit at the tilt drive can be decreased, and thereby it can be achieved to make operation control easier and to decrease electric power consumption.

Moreover, because the direction in which the tilt drive is performed by the second magnetic circuit is the same as the direction in which the movable block is tilted owing to the influence of the leakage flux of the second magnet, the force generated by the second magnetic circuit and the force generated by the influence of the leakage flux of the second magnet are not to be any resistance to each other, and thereby the improvement of the reliability of the operation of the focusing drive and the tilt drive can be achieved.

BRIEF DESCRIPTION OF THE DRAWINGS

FIG. 1 shows an embodiment the present invention together with FIGS. 2-5.

DESCRIPTION OF PREFERRED EMBODIMENTS

In the following, preferred embodiments of an optical pickup and a disc drive apparatus according to the present invention will be described with reference to the attached drawings.

A disc drive apparatus 1 is formed of each of required members and mechanisms, all arranged in an external housing 2 (see FIG. 1), and a not shown disc insertion opening is formed in the external housing 2.

Figure 1:
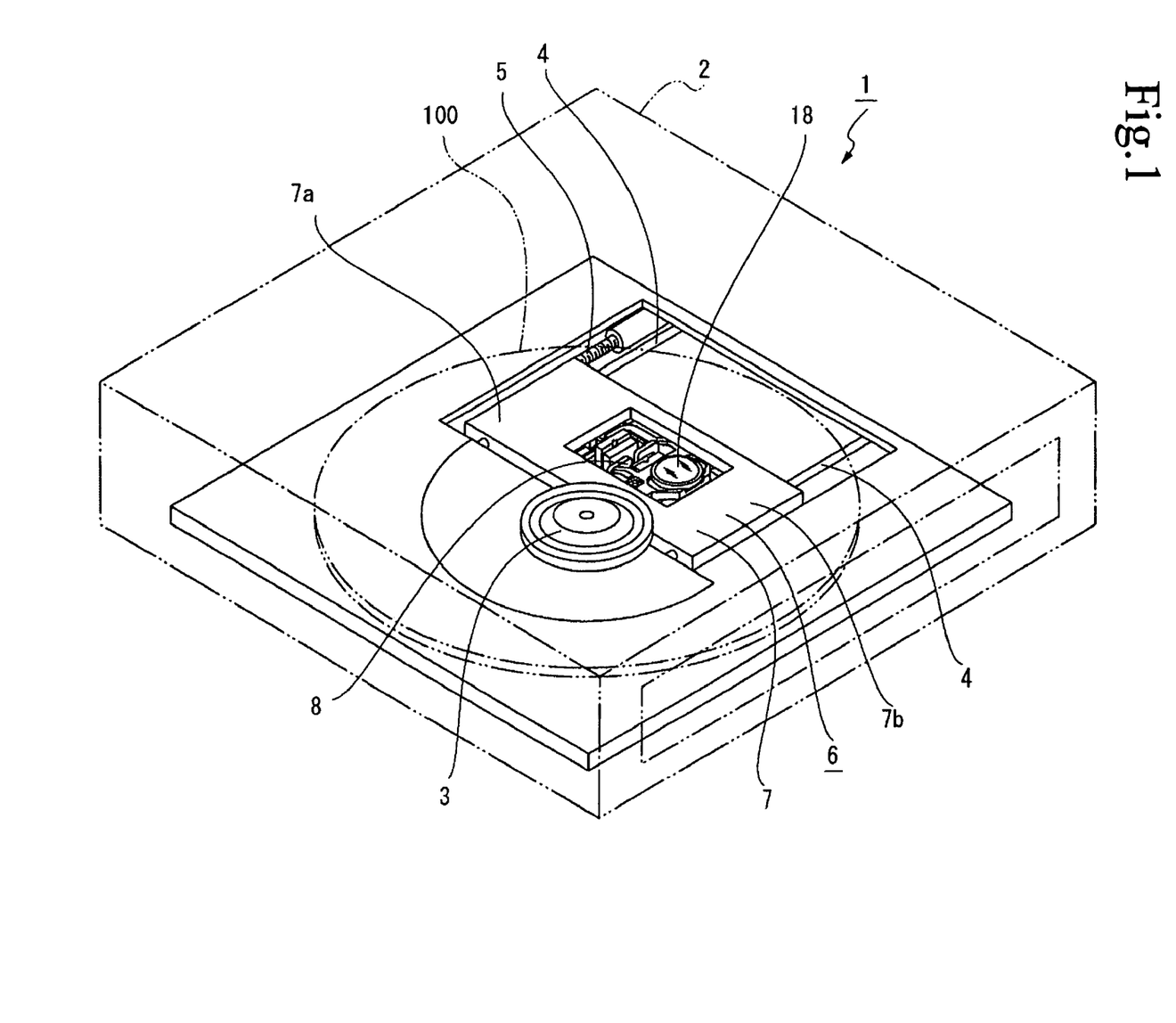
FIG. 1 is a schematic perspective view of a disc drive apparatus.

A not shown chassis is disposed in the external housing 2, and a disc table 3 is fixed to a motor shaft of a spindle motor attached to the chassis.

Parallel guide shafts 4 are attached to the chassis, and a lead screw 5 rotated by a not shown feed motor is supported on the chassis.

An optical pickup 6 includes a moving base 7, required optical parts provided on the moving base 7, and an objective lens driving apparatus 8 disposed on the moving base 7. Bearing portions 7a and 7b formed on both ends of the moving base 7 are severally supported by the guide shafts 4 slidably (see FIG. 1). A not shown nut member provided on the moving base 7 is screwed with the lead screw 5. When the lead screw 5 is rotated by the feed motor, the nut member is fed in the direction corresponding to the rotation direction of the lead screw 5, and then the optical pickup 6 is moved to a radial direction of a disc-shaped recording medium 100 mounted on the disc table 3.

Figure 2:
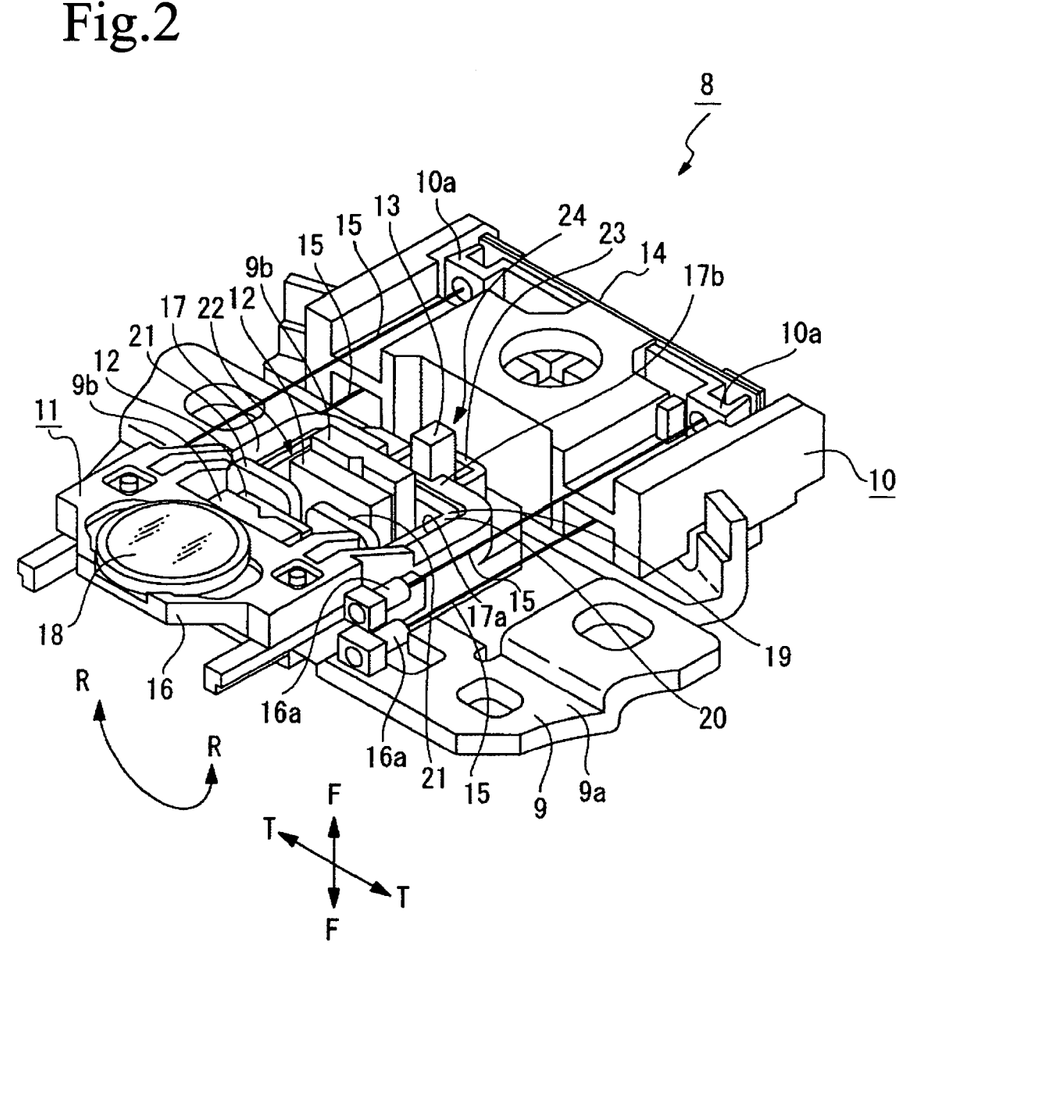
FIG. 2 is an enlarged perspective view of an objective lens driving apparatus.
Figure 3:
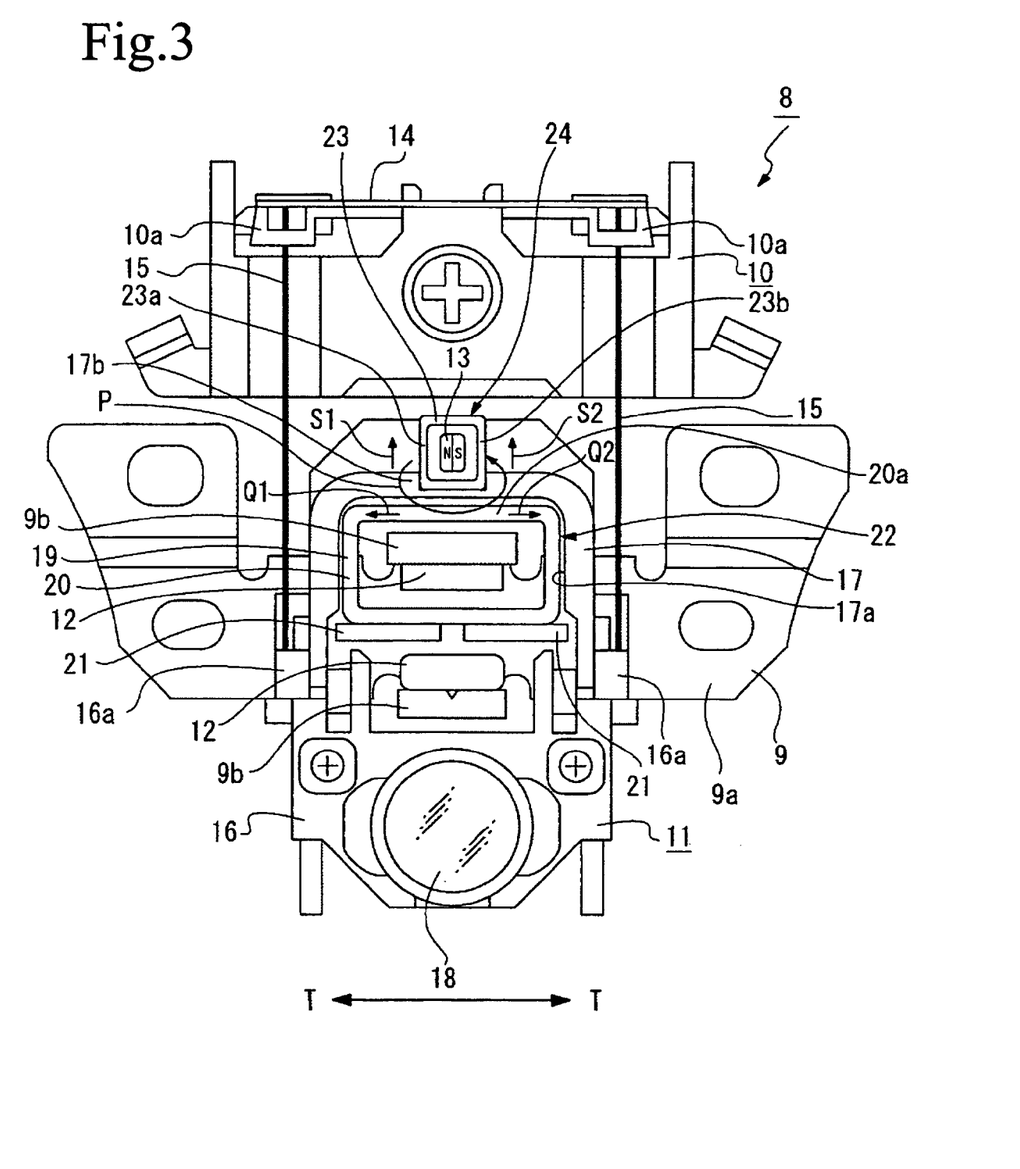
FIG. 3 is an enlarged plan view of the objective lens driving apparatus.
Figure 4:
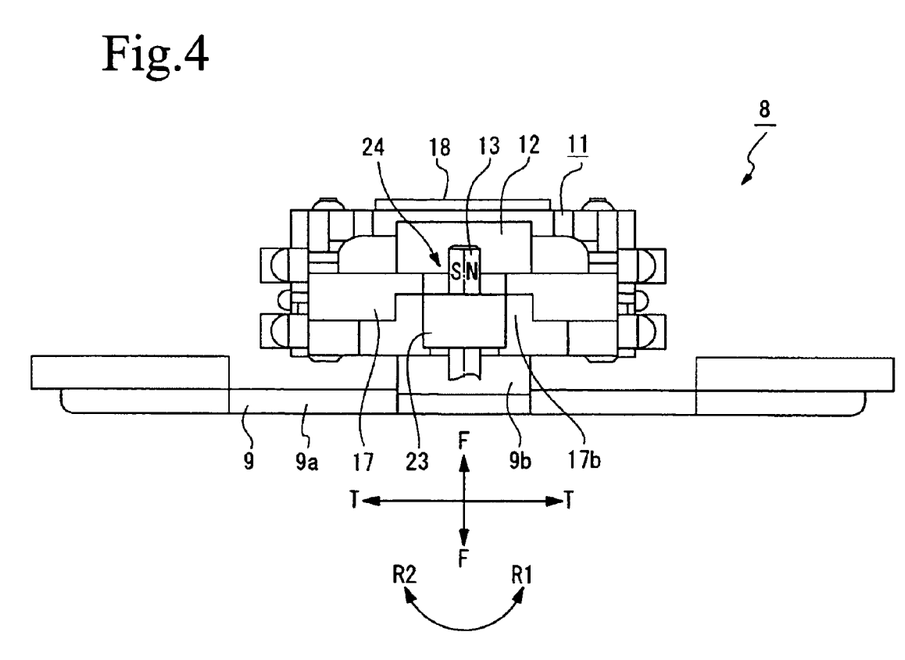
FIG. 4 is an enlarged rear view of the objective lens driving apparatus, in which a fixed block is omitted to be shown.

The objective lens driving apparatus 8 includes a base member 9, a fixed block 10 and a movable block 11 moving to the fixed block 10 (see FIGS. 2-4).

Each part of the base member 9 is made of a magnetic metallic material in a single body. The base member 9 is composed of a base portion 9a attached to the moving base 7, and yoke portions 9b bent to stand perpendicularly severally at both of a front end and a rear end of the base portion 9a.

First magnets 12 are severally attached to the surfaces, which are opposed to each other, of the yoke portions 9b.

A second magnet 13 is attached to the rear end of the base portion 9a. The second magnet 13 is formed in a shape of a square bar elongated in the vertical direction, and is polarized into an N pole and an S pole in a right and left direction, or the tracking direction.

The fixed block 10 is fixed on the moving base 7, and includes four spring attachment portions 10a separately in upper, lower, right and left positions at the rear end of the fixed block 10. A circuit board 14 is attached to the rear surface of the fixed block 10, and the circuit board 14 is connected to a not shown power supply circuit.

One end of each of support springs 15 is attached to the spring attachment portions 10a of the fixed block 10, and the end of each of the support springs 15 is connected to the circuit board 14 attached to the fixed block 10. A drive current for a focusing drive or a tracking drive is supplied from the power supply circuit to the support springs 15 through the circuit board 14.

The movable block 11 is composed of a lens attachment portion 16 positioned on the front side and a magnetic circuit portion 17 positioned on the rear side, both formed in a single body.

Two spring attachment projection portions 16a are severally provided on the right side and on the left side of the lens attachment portion 16. The two spring attachment projection portions 16a are severally separated into an upper one and a lower one. The other end of each of the support springs 15 is attached to each of the spring attachment projection portions 16a. Consequently, the movable block 11 is connected with the fixed block 10 to be held in the air with the support springs 15.

An arrangement hole 17a penetrating the magnetic circuit portion 17 from the upper side to the lower side is formed in the magnetic circuit portion 17. A coil attachment portion 17b is formed at the central part in the right and left direction at the rear end of the magnetic circuit portion 17.

An objective lens 18 is attached to the top surface of the lens attachment portion 16 to be held thereat.

A coil body 19 is attached to the magnetic circuit portion 17. The coil body 19 is formed of a focusing coil 20 and tracking coils 21, which are connected to the focusing coil 20.

The focusing coil 20 is formed to be substantially a square pillar long from side to side the axial direction of which coincides with the upper and lower direction. The tracking coils 21 are severally formed to be a thin ring, the axial direction of which coincides with the front and rear direction, and are attached to the front surface of the focusing coil 20 in parallel to each other on the right and the left sides. The coil body 19 is attached to the inner peripheral surface of the magnetic circuit portion 17 with being disposed in the arrangement hole 17a. In the state in which the coil body 19 is attached to the magnetic circuit portion 17, a space is formed on the front side of the coil body 19.

The yoke portions 9b of the base member 9, and the first magnets 12 attached to the yoke portions 9b are inserted into the arrangement hole 17a of the magnetic circuit portion 17 to be arranged therein. The first magnets 12 are positioned to be opposed to each other with a portion positioned on the front side of the focusing coil 20 and the tracking coils 21 put between them.

The base portion 9a and the yoke portions 9b of the base member 9, the first magnets 12, the focusing coil 20 and the tracking coils 21 constitute a first magnetic circuit 22 for moving the movable block 11 in the focusing direction or the tracking direction.

A drive current is supplied from the power supply circuit to each of the focusing coil 20 and the tracking coils 21 through the circuit board 14 and the support springs 15, which are attached to the fixed block 10.

When the drive current flows through the focusing coil 20, a thrust force is generated into a predetermined direction according to the direction of the drive current flowing through the focusing coil 20, and the movable block 11 is moved against the fixed block 10 in an F-F direction shown in FIGS. 2 and 4, i.e. in the focusing direction being one in which the movable block 11 approaches to or withdraws from the recording surface of the disc-shaped recording medium 100 mounted on the disc table 3.

When the drive current is supplied to the tracking coils 21, a thrust force is generated into a predetermined direction according to the direction of the drive current flowing through the tracking coils 21, the movable block 11 is moved against the fixed block 10 in a T-T direction shown in FIGS. 2-4, i.e. in the tracking direction being substantially a radial direction of the disc-shaped recording medium 100 mounted on the disc table 3.

A tilt coil 23 is attached to the coil attachment portion 17b of the magnetic circuit portion 17. The tilt coil 23 is formed to be substantially a square pillar having an axial direction in the upper and lower direction. Portions of the tilt coil 23 positioned separately on the left side and the right side of the tilt coil 23 are formed to be tilt drive portions 23a and 23b, respectively, for performing a tilt drive.

The second magnet 13 attached to the base portion 9a of the base member 9 is inserted into the inside of the tilt coil 23 to be disposed therein. Consequently, the tilt coil 23 and the second magnet 13 constitute a second magnetic circuit 24 for moving the movable block 11 in the tilt direction.

A drive current is supplied to the tilt coil 23 from the power supply circuit through, for example, a flexible printed wiring board, a Litz wire or the like, which is not shown.

When the drive current is supplied to the tilt coil 23, a thrust force is generated in a predetermined direction according to the direction of the drive current flowing through the tilt coil 23, and the movable block 11 is moved against the fixed block 10 in an R-R direction shown in FIGS. 2 and 4, i.e. the tilt direction being a rotation direction around the axis orthogonal to both of the focusing direction and the tracking direction.

When the movable block 11 is moved in the focusing direction, the tracking direction or the tilt direction, the support springs 15 are elastically deformed.

When the disc table 3 is rotated owing to the rotation of the spindle motor in the disc drive apparatus 1 configured as above, the disc-shaped recording medium 100 mounted on the disc table 3 is rotated, and at the same time the optical pickup 6 is moved into a radial direction of the disc-shaped recording medium 100. Thereby, a recording operation or a reproducing operation of the disc-shaped recording medium 100 is performed.

When a drive current is supplied to the focusing coil 20 in the recording operation or the reproducing operation, the movable block 11 of the objective lens driving apparatus 8 is moved against the fixed block 10 in the focusing direction F-F shown in FIGS. 2 and 4 as described above, and a focusing adjustment is performed in order that a spot of a laser beam exited from a not shown semiconductor laser provided on the moving base 7 to be radiated through the objective lens 18 may be condensed on a recording track on the disc-shaped recording medium 100. Moreover, when a drive current is supplied to the tracking coils 21, the movable block 11 of the objective lens driving apparatus 8 is moved against the fixed block 10 in the tracking direction T-T shown in FIGS. 2-4 as described above, and a tracking adjustment is performed in order that the spot of a laser beam exited from the semiconductor laser to be radiated through the objective lens 18 may be condensed on a recording track of the disc-shaped recording medium 100.

In the recording operation and the reproducing operation of the disc-shaped recording medium 100, a tilt adjustment is also performed at the same time in addition to the focusing adjustment and the tracking adjustment, both mentioned above. The tilt adjustment is performed by moving the movable block 11, while rotating, in the tilt direction R-R shown in FIGS. 2 and 4 in order to make the movable block 11 follow the disc-shaped recording medium 100 by means of a force generated according to a current flowing through the tilt drive portions 23a and 23b of the tilt coil 23 and a magnetic flux of the second magnet 13 when, for example, a tilt of the recording surface owing to a warpage of the disc-shaped recording medium 100, surface vibrations of the disc-shaped recording medium 100 during rotation, or the like is produced.

For example, when a current flowing in a clockwise direction as seen in a plane (S1 direction in FIG. 3) is supplied to the tilt coil 23 in a case where the second magnet 13 is polarized into an N pole and an S pole as shown in FIG. 4, an upwardly oriented moving force is generated in the tilt drive portion 23a on one side, and a downwardly oriented moving force is generated in the tilt drive portion 23b on the other side. Consequently, the movable block 11 is moved in an R1 direction. Conversely, when a current flowing in a counter-clockwise direction as seen in a plane (S2 direction shown in FIG. 3) is supplied to the tilt coil 23, an downwardly oriented moving force is generated in the tilt drive portion 23a on one side, and an upwardly oriented moving force is generated in the tilt drive portion 23b on the other side. Consequently, the movable block 11 is moved in an R2 direction.

As described above, because the first magnetic circuit 22 for performing the focusing drive and the tracking drive and the second magnetic circuit 24 for performing the tilt drive are provided separately from each other in the objective lens driving apparatus 8, the simplification of operation control can be achieved. Moreover, because the focusing coil 20 is configured to be only one, the improvement of sensitivity at the focusing operation can be achieved.

Moreover, because the second magnet 13 polarizes into the N pole and the S pole in parallel in the tracking direction is inserted into the tilt coil 23 to be disposed therein in the objective lens driving apparatus 8, the space inside the tilt coil 23 can be effectively utilized as the arrangement space of the second magnet 13, and thereby the miniaturization of the objective lens driving apparatus 8 can be achieved by an extent of the space.

Because the second magnet 13 is disposed near to the focusing coil 20 in the objective lens driving apparatus 8, the movable block 11 is influenced by a leakage flux from the second magnet 13 when the movable block 11 is moved in the focusing direction. That is, when a current flows through the focusing coil 20, the movable block 11 is moved in the focusing direction, and the current oriented to the right side or the left side flows through a portion 20a positioned on the rear side of the focusing coil 20. At this time, an upwardly or downwardly oriented moving force is generated at the portion 20a owing to a leakage flux P (see FIG. 3) of the second magnet 13, which operates in the way of traversing the portion 20a.

Figure 5:
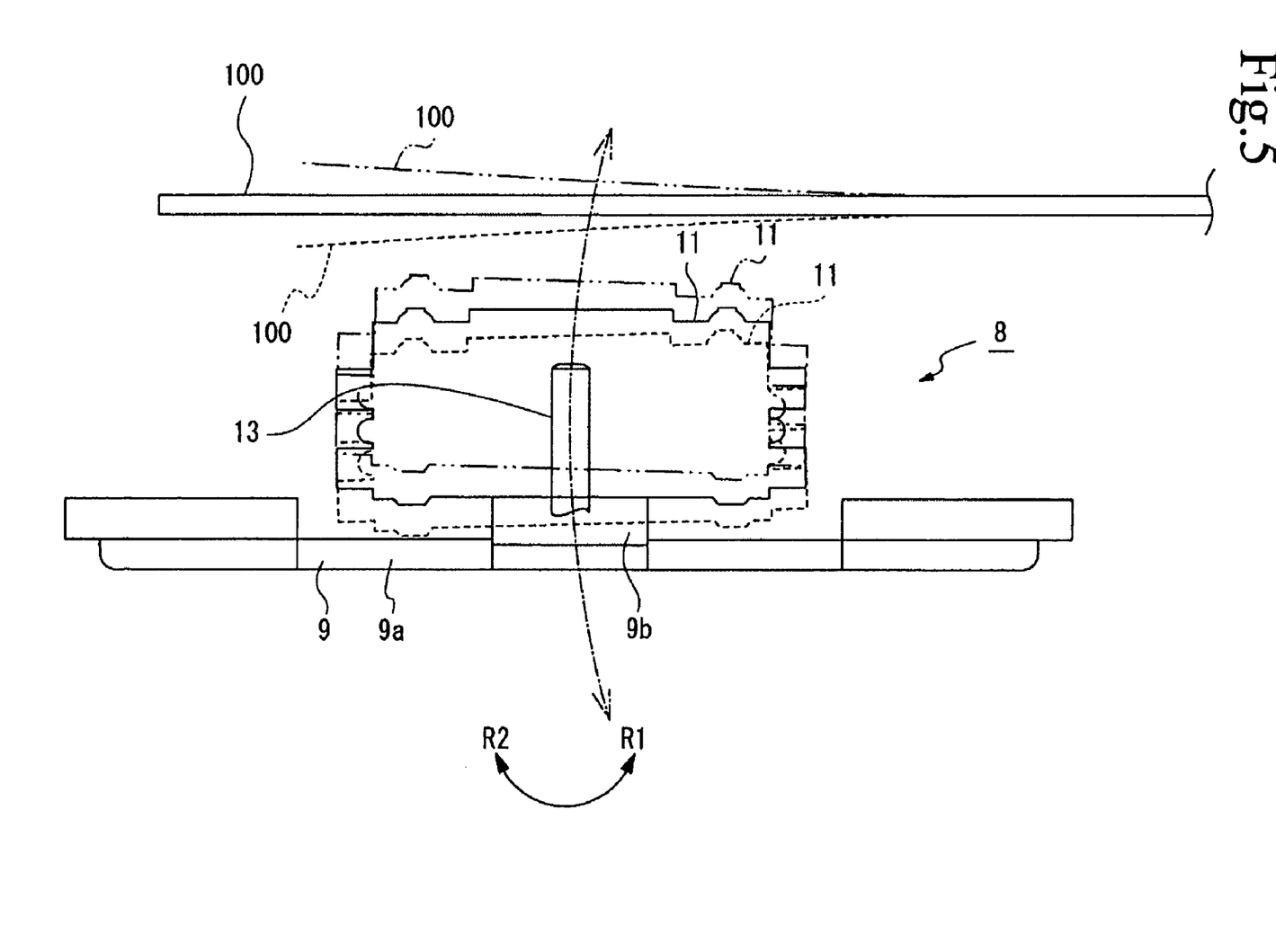
FIG. 5 is a conceptual view for illustrating an operation state of a movable block of the objective lens driving apparatus.

For example, when a current flows through the focusing coil 20 into a clockwise direction as seen in a plane, the movable block 11 is upwardly moved in accordance with the focusing drive, and a current flows through the portion 20a of the focusing coil 20 in the rightward direction (Q2 direction shown in FIG. 3). At this time, the disc-shaped recording medium 100 is made to be in the state of a warpage in which the outer peripheral portion of the disc-shaped recording medium 100 is upwardly displaced owing to surface vibrations or the like (the state shown by a chain double-dashed line in FIG. 5). Consequently, the movable block 11 is tilt-wise driven by the second magnetic circuit 24 into the direction (R2 direction shown in FIG. 4) in which the portion positioned on the outer circumference side of the disc-shaped recording medium 100 is upwardly displaced and the portion positioned on the inner circumference side of the disc-shaped recording medium 100 is downwardly displaced in order to follow the warped direction of the disc-shaped recording medium 100.

When a current flows through the portion 20a of the focusing coil 20, the moving force is generated at the portion 20a owing to the leakage flux of the second magnet 13 as described above. At this time, in the objective lens driving apparatus 8, the polarized state of the second magnet 13 is set so that the influence of the leakage flux is oriented to the direction by which the movable block 11 is moved in the R2 direction. That is, the second magnet 13 is configured so that the N pole thereof resides on the left side and the S pole thereof resides on the right side. The downwardly oriented moving force is generated at the left side portion of the portion 20a (the portion positioned on the inner circumference side of the disc-shaped recording medium 100), and the upwardly oriented moving force is generated at the portion on the right side of the portion 20a (the portion positioned on the outer circumference side of the disc-shaped recording medium 100). The movable block 11 is tilted in the R2 direction shown in FIGS. 4 and 5 (indicated by a chain double-dashed line in FIG. 5) in order to follow the warped direction of the disc-shaped recording medium 100.

Conversely, when a current flows through the focusing coil 20 in the counter-clockwise direction as seen in a plane, the movable block 11 is downwardly moved in accordance with the focusing drive, and the current flows through the portion 20a of the focusing coil 20 toward the left side (Q1 direction shown in FIG. 3). At this time, the disc-shaped recording medium 100 is made to be warped in which the outer peripheral portion of the disc-shaped recording medium 100 is downwardly displaced owing to surface vibrations or the like (the state shown by a dotted line in FIG. 5). Consequently, the movable block 11 is tilt-wise driven by the second magnetic circuit 24 in the direction (R1 direction shown in FIG. 4) in which the portion positioned on the outer circumference side of the disc-shaped recording medium 100 is downwardly displaced and the portion positioned on the inner circumference side of the disc-shaped recording medium 100 is upwardly displaced in order to follow the warped direction of the disc-shaped recording medium 100.

At this time, because the second magnet 13 is configured so that the N pole thereof resides on the left side and the S pole thereof resides on the right side, the upwardly oriented moving force is generated at the left side portion of the portion 20a (the portion positioned on the inner circumference side of the disc-shaped recording medium 100), and the downwardly oriented moving force is generated at the portion on the right side of the portion 20a (the portion positioned on the outer circumference side of the disc-shaped recording medium 100). The movable block 11 is consequently tilted in the R1 direction shown in FIGS. 4 and 5 (indicated by a dotted line in FIG. 5) in order to follow the warped direction of the disc-shaped recording medium 100.

Incidentally, if the objective lens driving apparatus 8 is set in order that the movable block 11 may be downwardly moved in accordance with the focusing drive when a current flows through the focusing coil 20 in the clockwise direction as seen in a plane, and that the movable block 11 may be upwardly moved in accordance with the focusing drive when a current flows through the focusing coil 20 in the counter-clockwise direction as seen in a plane, then the second magnet 13 is arranged to have the S pole on the left side and the N pole on the right side. Consequently, also in this case, the influence of the leakage flux of the second magnet 13 is exerted on the movable block 11 so as to tilt the movable block 11 in the warped direction of the disc-shaped recording medium 100 similarly to the above-described case.

In the objective lens driving apparatus 8, as described above, when a current flows through the focusing coil 20, the influence of the leakage flux of the second magnet 13 is exerted on the movable block 11 so as to tilt the movable block 11 in the warped direction of the disc-shaped recording medium 100.

Consequently, the drive quantity of the movable block 11 by the second magnetic circuit 24 at the time of a tilt drive can be decreased, and it can be achieved to make the operation control easier and to decrease electric power consumption.

Moreover, because the direction of a tilt drive by the second magnetic circuit 24 is the same as the direction of a tilt of the movable block 11 owing to the influence of the leakage flux of the second magnet 13, the force generated by the second magnetic circuit 24 and the force generated by the influence of the leakage flux of the second magnet 13 are not any resistance to each other, the improvement of the reliability of the operation of the focusing drive and the tilt drive can be achieved.

Incidentally, in the above, the so-called moving coil type objective lens driving apparatus 8, in which the movable block 11 is provided with the focusing coil 20, the tracking coils 21 and the tilt coil 23, is exemplified to be described. However, the scope to which the present invention is applied is not limited to the moving coil type objective lens driving apparatus 8, and the present invention can be also applied to the so-called moving magnet type objective lens driving apparatus, in which a fixed block is provided with a focusing coil, a tracking coil or a tilt coil and a movable block is provided with magnets corresponding to those coils.

Moreover, in the above, the description is given to the case where the focusing direction is supposed to be the upper and lower direction and the tracking direction is supposed to be the right and left direction. However, these directions are shown as examples for the sake of the convenience of description, and the directions are not especially limited to those directions.

The detailed forms and the configurations of the respective parts shown as the best mode for implementing the above-mentioned invention are all only examples of the actualization for implementing the present invention, and the scope of the present invention should not be interpreted to be limited to those forms and configurations.

The invention claimed is:

1. An optical pickup provided with a moving base moving in a radial direction of a disc-shaped recording medium mounted on a disc table, and an objective lens driving apparatus arranged in said moving base, wherein said objective lens driving apparatus includes: a fixed block fixed to said moving base; a movable block moving in a focusing direction being one in which the movable block approaches to or withdraws from a recording surface of said disc-shaped recording medium against said fixed block, a tracking direction being substantially a radial direction of said disc-shaped recording medium, and a tilt direction being a rotation direction around an axis orthogonal to both of the focusing direction and the tracking direction, and holding said objective lens; a support spring connecting said fixed block and said movable block with each other; a focusing coil to be energized at an operation of said movable block in the focusing direction; a tracking coil to be energized at an operation of said movable block in the tracking direction; a tilt coil to be energized at an operation of said movable block in the tilt direction; a first magnet constituting a first magnetic circuit together with said focusing coil and said tracking coil; and a second magnet constituting a second magnetic circuit together with said tilt coil, arranged in a state being inserted into said tilt coil, wherein: said objective lens and said second magnet are positioned separately in a direction orthogonal to both of the focusing direction and the tracking direction, said second magnet has an N pole and an S pole, both polarized in juxtaposition in the tracking direction, and portions of said tilt coil opposed to each other in the tracking direction with said second magnet put therebetween are severally formed to be a tilt drive portion for moving said movable block in the tilt direction.

2. The optical pickup according to claim 1, wherein: said focusing coil is arranged between said objective lens and said second magnet, said movable block is configured to tilt in the tilt direction owing to a traverse a leakage flux of said second magnet across said focusing coil when said focusing coil is energized, and positions of the N pole and the S pole of said second magnet are set in order that a tilt of said movable block owing to the leakage flux of said second magnet when the focusing coil is energized may be in a same direction as a tilt direction of the recording surface owing to a warpage of said disc-shaped recording medium.

3. A disc drive apparatus equipped with a disc table, on which a disc-shaped recording medium is mounted, and an optical pickup radiating a laser beam to said disc-shaped recording medium mounted on said disc table through an objective lens, wherein: said optical pickup includes: a moving base moving in a radial direction of said disc-shaped recording medium mounted on said disc table; and an objective lens driving apparatus arranged on said moving base, and said objective lens driving apparatus includes: a fixed block fixed on said moving base; a movable block moving in a focusing direction being one in which said movable block approaches to or withdraws from a recording surface of said disc-shaped recording medium against said fixed block, a tracking direction being substantially the radial direction of said disc-shaped recording medium, and a tilt direction being a rotation direction around an axis orthogonal to both of the focusing direction and the tracking direction, and holding said objective lens; a support spring connecting said fixed block and said movable block with each other; a focusing coil to be energized at an operation of said movable block in the focusing direction; a tracking coil to be energized at an operation of said movable block in the tracking direction; a tilt coil to be energized at an operation of said movable block in the tilt direction; a first magnet constituting a first magnetic circuit together with said focusing coil and said tracking coil; and a second magnet constituting a second magnetic circuit together with said tilt coil, arranged in a state being inserted into said tilt coil, wherein: said objective lens and said second magnet are positioned separately in a direction orthogonal to both of the focusing direction and the tracking direction, said second magnet has an N pole and an S pole, both polarized in juxtaposition in the tracking direction, and portions of said tilt coil opposed to each other in the tracking direction with said second magnet put between them are severally formed to be a tilt drive portion for moving said movable block in the tilt direction.

4. The disc drive apparatus according to claim 3, wherein said focusing coil is arranged between said objective lens and said second magnet, said movable block is configured to tilt in the tilt direction owing to a traverse a leakage flux of said second magnet across said focusing coil when said focusing coil is energized, and positions of the N pole and the S pole of said second magnet are set in order that a tilt of said movable block owing to the leakage flux of said second magnet when said focusing coil is energized may be in a same direction as a tilt direction of said recording surface owing to a warpage of said disc-shaped recording medium.

* * * * *